(12) United States Patent
Wind

(10) Patent No.: US 10,203,062 B2
(45) Date of Patent: Feb. 12, 2019

(54) DEVICE FOR CLOSING THE OPENING END OF A LINING HOSE

(71) Applicant: SML Verwaltungs GmbH, Rohrbach (DE)

(72) Inventor: Herbert Wind, Albersweiler (DE)

(73) Assignee: SML VERWALTUNGS GMBH, Rohrbach (DE)

(*) Notice: Subject to any disclaimer, the term of this patent is extended or adjusted under 35 U.S.C. 154(b) by 71 days.

(21) Appl. No.: 15/193,442

(22) Filed: Jun. 27, 2016

(65) Prior Publication Data

US 2017/0059077 A1 Mar. 2, 2017

(30) Foreign Application Priority Data

Jun. 26, 2015 (DE) .................. 10 2015 110 324

(51) Int. Cl.
| | | |
|---|---|---|
| *F16L 55/10* | (2006.01) | |
| *F16L 55/165* | (2006.01) | |
| *B29C 53/36* | (2006.01) | |
| *F16L 55/18* | (2006.01) | |

(52) U.S. Cl.
CPC ............ *F16L 55/165* (2013.01); *B29C 53/36* (2013.01); *F16L 55/10* (2013.01); *F16L 55/1654* (2013.01); *F16L 55/18* (2013.01)

(58) Field of Classification Search
CPC ............ F16L 55/10; F16L 55/18; Y10T 16/05
USPC ........................................ 138/96 R, 96 T, 109
See application file for complete search history.

(56) References Cited

U.S. PATENT DOCUMENTS

| | | | | | |
|---|---|---|---|---|---|
| 1,821,520 | A | * | 9/1931 | Krag .................. | B65D 59/06 138/96 T |
| 4,233,469 | A | * | 11/1980 | Steppe ................ | H02G 3/0616 138/96 T |
| 4,697,830 | A | * | 10/1987 | Wood .................. | B25B 5/147 138/96 T |
| 5,755,345 | A | * | 5/1998 | Valyi .................. | B65D 41/0457 138/89 |
| 7,182,611 | B2 | * | 2/2007 | Borden ................ | H01R 4/643 439/92 |
| 7,730,940 | B2 | * | 6/2010 | Knippa ............... | E21B 33/1208 166/118 |
| 8,882,517 | B2 | * | 11/2014 | Smith .................. | H01R 4/64 439/92 |
| 9,000,310 | B2 | * | 4/2015 | Smith .................. | H02G 3/22 174/650 |

FOREIGN PATENT DOCUMENTS

| | | |
|---|---|---|
| WO | WO 95/04646 | 2/1995 |
| WO | WO 00/73692 A1 | 12/2000 |

\* cited by examiner

*Primary Examiner* — Patrick F Brinson
(74) *Attorney, Agent, or Firm* — The Marbury Law Group, PLLC

(57) ABSTRACT

The present invention relates to a closing mechanism for closing one opening end of a lining tube, comprising at least two separate or separable ring segment shaped elements which are or can be connected to one another by means of at least one connection element and which jointly form or can form a hollow cylinder, wherein the hollow cylinder, in particular in sections, can be or is closed with at least one closing element, an application of a device according to the present invention, an arrangement of a mechanism according to the present invention and a lining tube as well as a method for closing one opening of a lining tube.

19 Claims, 4 Drawing Sheets

DEVICE FOR CLOSING THE OPENING END OF A LINING HOSE

The present invention relates to a device for sealing one opening end of a lining tube.

Methods for the rehabilitation of piping systems, in which, for example, liquid or gaseous media are conveyed, are known in the prior art and are frequently described.

Methods are known, for example, in which the defective or damaged sections of the piping system are replaced with new sections. However, this is expensive and not always possible.

Methods are furthermore known from the prior art, in which for the rehabilitation of piping systems, e.g. of ducts and similar pipe systems, a flexible lining tube with at least one hardenable layer impregnated with a curable resin, also known as liner, is inserted into the piping system. After the insertion, the lining tube is expanded, so that it clings closely against the inside wall of the piping system. The resin is subsequently cured.

Producing such type of lining tube is described in WO 95/04646, for example. Such a lining tube has usually one lightproof outer protective film, at least one inner film that is permeable for specific wavelength ranges of electromagnetic radiation, as well as at least one hardenable layer impregnated with resin, which layer is located between the inner film and the outer film.

The outer tubular film is to keep the resin used for impregnation from escaping from the hardenable layer into the environment. This requires good impermeability and binding of the outer film tube to the resin impregnated, hardenable layer.

A lining tube comprising one inner film tube, one resin-impregnated fiber strip as curable layer and one outer film tube, which is laminated with a non-woven fabric on its inside, is known from WO 00/73692 A1.

To produce the outer film tube, the resin-impregnated fiber band is frequently wrapped onto the inner film tube (the lining tube) of a lining tube helically and overlapping. Subsequently, while forming the outer film tube, the outer film is also wrapped helically and overlapping around the resin impregnated fiber strip.

For this purpose, the inner film tube itself is also wrapped around a wrapping mandrel, to simplify manufacture. Alternatively, WO 95/04646 discloses that a prefabricated inner film tube can be inflated and itself be used as winding mandrel, for example. For this purpose, such a prefabricated inner film tube is produced from film strip, the film edges of which are connected to one another by welding or adhesive bonding in order to form the inner film tube.

The lining tubes are inserted into the piping systems to be rehabilitated prior to the curing and are inflated by means of a fluid, as a rule compressed air. A curing device, which has a radiation source, is then inserted into the inflated lining tube, and is passed through the curing tube to use the radiation energy to activate or to carry out the hardening of the curable layers of the lining tube.

For inflating the lining tube, compressed air is applied to one opening end of the lining tube according to the state-of-the-art and the opposite opening end of the lining tube is sealed with a closing mechanism, a so-called packer. For this purpose, this closing mechanism includes a hollow cylinder and a cover element with which the hollow cylinder can be sealed.

The closing mechanisms known from the prior art have the disadvantage that they must be inserted into the line to be rehabilitated through an access opening which may be small. If the orifice size of the access opening is smaller than the diameter of the line to be rehabilitated, a traditional closing mechanism cannot be used. In this case, the access opening must first be enlarged at great expense, so that the closing mechanism can be inserted. This requires significant time and is very expensive.

State-of-the-art closing mechanisms are moreover very heavy, which is why connecting them to a lining tube within the tight space of a piping system is very complex and expensive.

The purpose of the present invention therefore is to overcome the disadvantages of the prior art and to specifically provide a closing mechanism which can also be inserted into access openings smaller than the diameter of the line to be rehabilitated and which at the same time facilitates an easier connection with the lining tube.

This object is accomplished by a closing mechanism for sealing one opening end of a lining tube according to claim 1.

This comprises at least two separate or separable ring segment shaped elements, which are or can be connected to one another by means of at least one connection element and which together form or can form a hollow cylinder, wherein the hollow cylinder can be or is sealed with at least one closing element, particularly in sections.

According to the present invention, the hollow cylinder is made up from at least two separable ring segment shaped elements, which are or can be connected to one another, and which, when they are connected to one another, jointly form a hollow cylinder as part of the closing mechanism. According to the present invention, this partitioning of a hollow cylinder into individual segments achieves many advantages. The individual ring segment shaped elements can also be inserted into a piping system through small access openings and, taken individually, respectively weigh less compared with the hollow cylinder as such. It is therefore no longer necessary to enlarge access openings at great expense. In addition, due to the low weight of the individual segments, this also ensures ease of handling.

In the present case, according to one embodiment of the present invention, the terms "circular," "ring segment shaped" elements, "hollow cylinder" and the further features associated therewith must not understood to be limited to circular embodiments as such. The selected designations serve the ease of understanding of the present invention and can therefore also include spheroidal, in particular spheroidal convex, geometries such as oval embodiments, for example.

According to the present invention, it can be provided that the device n, with n=1, 2, 3, 4, 5, 6, 7, 8, 9, 10 or more, includes ring segment shaped elements, preferably exactly 3 ring segment shaped elements, wherein particularly each of the ring segment shaped elements has a central angle of 360/n, preferably of 120°.

It was found to be advantageous to provide n ring segment shaped elements. In this case, with an increasing number n of ring segment shaped elements, the required diameter of the access openings and the weight of each of the ring segment shaped elements, can be reduced. Therefore, even with small access openings and large diameter piping systems, a closing mechanism can be passed through these. It has proven to be particularly advantageous if three ring segment shaped elements are forming one hollow cylinder, wherein each of the ring segment shaped elements has a central angle of 120°.

A central angle is an angle formed between two straight lines, which connect the center of a circle with two points on the radius of the circle. Three ring segment shaped elements, each of which have a central angle of 120° therefore, when connected to one another, form a hollow cylinder. It is obvious to one skilled in the art that the ring segment shaped elements according to the present invention in particular have an identical internal or external radius, so that they can jointly form the hollow cylinder.

As already stated, according to one embodiment of the present invention, a hollow ovoid can be formed by the ring segment shaped elements, for example.

According to one embodiment of the present invention, the hollow cylinder formed by the at least two ring segment shaped elements has a height h and a wall thickness b formed by the difference of the external radius and the internal radius, wherein each of the ring segment shaped elements has at least one connection element on each of its opposite front faces, wherein a first front face of a first ring segment shaped element forms a connection area with an adjacent front face of a further ring segment shaped element.

A connection of the ring segment shaped elements on or adjacent to their front faces was found to be advantageous for being able of connecting same to one another easily. In this context, the "adjacent" feature is to be preferably understood as the connection elements being spaced apart 25% maximum, in particular 15% maximum, preferably at most 10% of the height of the hollow cylinder from the front face.

According to the present invention it can also be that the connection elements are positioned on the inside of the ring segment shaped elements, wherein the one or the more than one connection elements of a first ring segment shaped element is or are positioned on or adjacent to its/their first front face end along the height h of the hollow cylinder, offset with respect to the connection element(s) arranged on a further front face end of another adjacently positioned ring segment shaped element.

If the connection elements are arranged on the inside (i.e. on the side of the closing mechanism facing away from the lining tube) of the ring segment shaped elements, this has many advantages. To begin with, such an arrangement on the inside can prevent damaging the lining tube that is positioned on the outside, or the risk of such damage can be significantly reduced. The offset arrangement of the connection elements makes it possible for them to interlock, so that in each case the connection elements of a first ring segment shaped element and a further ring segment shaped element can absorb the forces which occur, in particular when equally distributed.

In so doing, it can be advantageous that at least one connection element, in particular all connection elements, are designed in the form of hollow cylinders, wherein particularly the hollow cylinders are positioned such that the centers of the hollow cylinders of two adjacent front faces of two side-by-side ring segment shaped elements are aligned with one another, wherein particularly a rod-shaped locking element is or can be inserted in the aligned hollow cylinders.

Such a design of the connection elements as hollow cylinders and interlocking same with one another using a rod-shaped locking element facilitates a quick and secure connection of two circular segment shaped elements. In addition, the front faces of the ring segment shaped elements can be aligned with one another when interlocking, as it were.

According to one embodiment of the present invention, it can also be provided that the connection areas of the ring segment shaped elements are insulated with the aid of an insulation means, in particular fluid-tight, in particular by means of insulation tape.

Such an insulation of the connection areas has the particular advantage that pressure losses in the connection area can be minimized or be avoided.

It may also be preferred that at least one sidewall of at least one of the ring segment shaped elements has at least one interlocking mechanism for the at least one closing element, in particular in form of a threaded rod projecting to the outside perpendicular relative to the sidewall.

Integrating a locking mechanism for the closing element on the sidewall of the ring segment shaped elements is advantageous because said elements facilitate a simple connection of the closing element with the ring segment shaped elements. In addition, this is advantageous since, as a result of such connection, the closing element absorbs incident forces and further increases the stability of the closing mechanism according to the present invention.

It may also be provided that at least one closing element has a circular shape and in particular has a diameter larger than or equal to the inner diameter and/or smaller or equal to the outside diameter of the hollow cylinder.

It is obvious that the closing element preferably may be or is formed particularly in the shape of a one-piece circular disk. But in particular, it is also provided that the closing element is in multiple parts and will only be connected to the circular disk in the piping system. This has the particular advantage that the elements of the circular disk, too, can be inserted into the piping system through a small access opening, smaller than the diameter of the circular disk.

Furthermore, according to the present invention it can be preferable that at least one of the ring segment shaped elements is or can be connected with a lifting device, wherein the lifting device is U-shaped in order to enclose the ring segment shaped element to be lifted in sections, and wherein the lifting device in particular is or can be connected permanently to the ring segment shaped element by means of fastening elements.

It can be preferred that the lifting device includes at least two U-shaped elements which are in particular arranged in parallel, wherein a mounting element is arranged between the U-shaped elements with which mounting element a lifting device can be or is connected, and which is mounted displaceably mounted in oblong recesses of the U-shaped elements.

It has proven advantageous if at least one of the ring segment shaped elements according to the present invention is lifted by means of a lifting device, so that the forces required for it must not be provided by the user. To connect the lifting device with the ring segment shaped element, the lifting device according to the present invention has proven to be particularly advantageous. The U-shaped lifting device according to the present invention can be inserted on the face of the ring segment shaped element and surrounds it in sections. To fix the lifting device, fastening elements are preferably used which produce contact pressure by means of screw connectors and firmly connect the lifting device with the ring segment shaped element for lifting, for example.

As the ring segment shaped elements can vary in thickness or strength, and the lining tubes may have a different weight, it is preferable that the U-shaped lifting device includes at least two U-sections arranged in parallel. In between the at least two U-sections, a mounting element is arranged on which the lifting device can be or is attached. The mounting element is preferably rod-shaped and is displaceably arranged along the two U-sections in recesses of same, so that said mounting element can be arranged on desired positions for balanced lifting within the recesses, depending on the thickness of the ring segment shaped elements and the weight of the lining tube. These recesses are preferably corrugated, in order to form defined positions for the mounting element.

The present invention also provides an arrangement comprising a device according to one of the preceding claims and a lining tube, wherein the device is inserted into the area of one opening end of the lining tube, in particular in sections.

The present invention moreover provides for using a device according to any of the claims 1 to 8 for closing one opening end of a lining tube.

The purpose of the present invention is furthermore solved by methods for closing one opening of a lining tube, comprising the following steps, particularly in this sequence:
  a) Provision of a lining tube;
  b) Provision of a closing mechanism according to the present invention
  c) Arranging an area of the lining tube above a first ring segment shaped element;
  d) Lifting of the first ring segment shaped element;
  e) Connection of at least one further
    ring segment shaped element with the first
    ring segment shaped element or the further
    ring segment shaped elements; and
  f) Lowering of the hollow cylinder formed from the ring segment shaped elements.

It has proven to be advantageous, if initially in a step a) a lining tube is provided and subsequently in a step b) a closing mechanism according to the present invention is provided. It can obviously also be provided that step b) is done before step a). After providing the lining tube and the closing mechanism, in a subsequent step c) sections of the lining tube can be arranged on a ring segment shaped element of the device according to the present invention. In the next step d), the ring segment shaped element is then lifted either manually and/or with the aid of a lifting device. In the lifted state of the first ring segment shaped element, this can then be simply connected with the further ring segment shaped elements to form a hollow cylinder. Finally, the hollow cylinder formed from the ring segment shaped elements can be lowered in a step f).

The method according to the present invention can furthermore particularly include the following step, particularly after step c), of
  g) Interlocking the lining tube with the first ring segment shaped element, particularly by means of a screw connector.

Such interlocking of the lining tube with the first ring segment shaped element has the particular advantage that the lining tube cannot slip out of place when the ring segment shaped element is lifted, but is securely connected with same.

It can also be provided that the method according to the present invention furthermore includes the following step, in particular after step e), of
  h) Sealing the junctions of the ring segment shaped elements, in particular by means of insulating tape.

Such sealing is advantageous in that the applied excess pressure cannot escape through the connection area, or only at a reduced rate.

The method according to the present invention can furthermore comprise the step, particularly after step f), of
  i) Securing the closing element with the hollow cylinder, in particular for sealing the opening end of the lining tube.

It can furthermore be provided that for lifting according to step d) a lifting device is used which comprises a U-shaped profile, and which is arranged, from the front face of the ring segment shaped element, in such a manner as to enclose the same in sections, wherein the lifting device comprises a mounting element which is connected with a lifting device.

Finally, it can be provided that the lifting device includes at least two U-shaped elements which are arranged in parallel, wherein the mounting element is arranged between the U-shaped elements in oblong recesses of the U-shaped elements, and the mounting element is displaced within the oblong recesses depending on the thickness of the ring segment shaped element and/or a lining tube in order to adjust vertical lifting of the ring segment shaped element.

Further features and advantages of the invention can be derived from the subsequent description which provides details of exemplary embodiments of the invention with reference to schematic drawings, without thereby limiting the invention.

LIST OF ILLUSTRATIONS

FIG. 1 is a schematic lateral view of a closing mechanism according to the present invention, FIG. 2 is a schematic top view onto a connection area of a closing mechanism according to the present invention, FIG. 3 is a schematic flow chart of a method according to the present invention, FIG. 4 is a schematic perspective view of an embodiment of a lifting device according to the present invention, and FIG. 5 is an alternative schematic perspective view of the lifting device according to FIG. 4.

Figure 1:
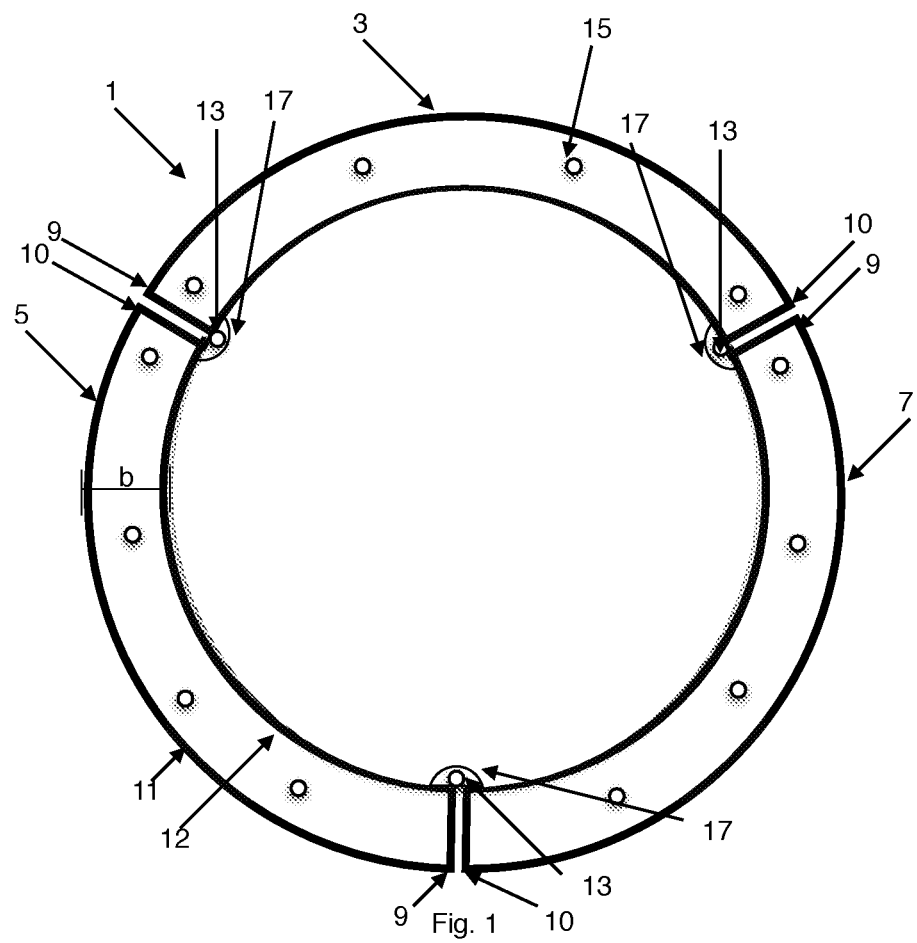
FIGS. 1 and 2 are a schematic lateral view of a closing mechanism according to the present invention and a schematic top view onto a connection area of the closing mechanism according to the present invention.

Said closing mechanism includes three separable ring segment shaped elements 3, 5, 7, which are connected to one another by means of at least one connection element 13. The three ring segment shaped elements 3, 5, 7 jointly form a hollow cylinder 1 which can be closed with a closing element (not shown). The three ring segment shaped elements 3, 5, 7 have a 120° central angle, wherein the hollow cylinder 1 formed by the three ring segment shaped elements 3, 5, 7 has a height h and a wall thickness b which is formed by the difference between the external radius 11 and the internal radius 12.

Each of the ring segment shaped elements 3, 5, 7 has at least one connection element 13 on each of its opposite front face ends 9, 10. A first front face of the first ring segment shaped element 3 forms a connection area with the adjacent front face of the second ring segment shaped element 5 and the second front face of the first ring segment shaped element 3 forms a connection area with the adjacent front face of the third ring segment shaped element 7. Similarly, the adjacently arranged front faces of the second and of the third ring segment shaped element form a third connection area.

Figure 2:
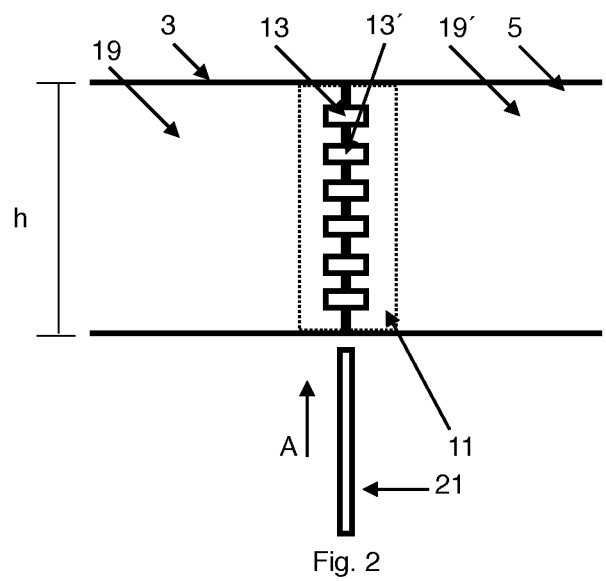
Figure 3:
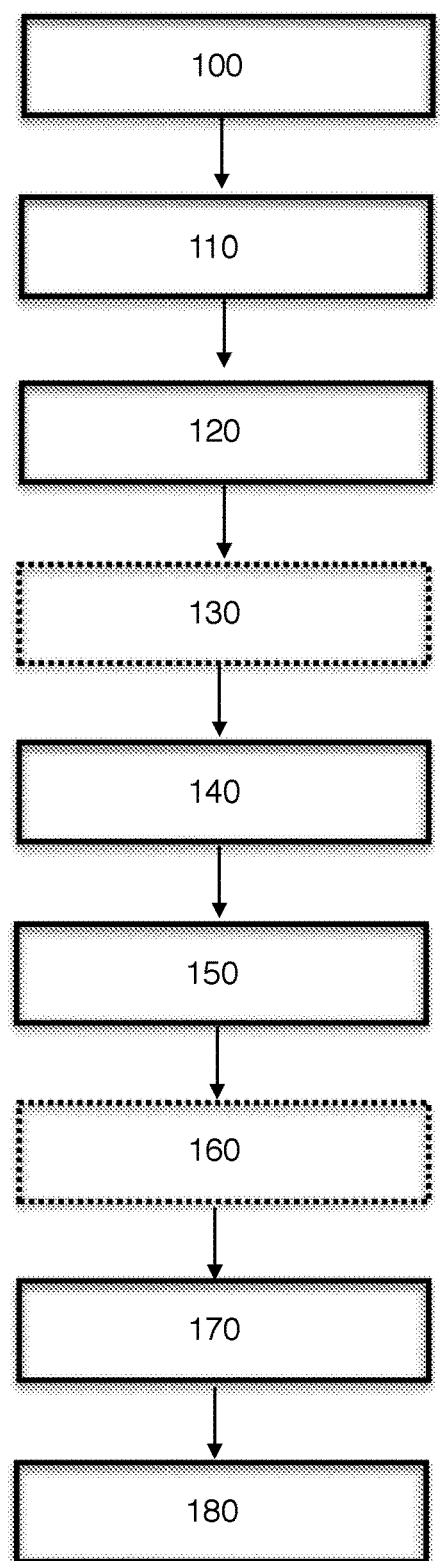

As shown in FIG. 2, the connection elements 13 are arranged offset relative to one another in the respective connection areas on the inside of the ring segment shaped elements 3, 5, 7 along the height h of the hollow cylinder. As illustrated in the embodiment shown, the connection elements 13 are designed in the form of hollow cylinders, wherein the hollow cylinders are arranged such that the centers of the hollow cylinders of two adjacent front faces of two adjacent ring segment shaped elements 3, 5, 7 are aligned with one another. A rod-shaped interlocking element 21 can be inserted into the aligned hollow cylinders along a direction A to connect the ring segment shaped elements with each other.

An insulation means 17 seals the connection areas of the ring segment shaped elements 3, 5, 7. In the illustrated embodiment, the sidewalls also show the interlocking mechanisms 15 for the closing element [not shown], in the illustrated embodiment in form of a threaded rod projecting perpendicular to the outside relative to the sidewall.

In a step 100, one embodiment of the method according to the present invention initially comprises the provision of a lining tube and, in a subsequent step 110, the provision of a closing mechanism according to the present invention. The steps 101 and 110 can obviously also be carried out in the reverse sequence. In a step 120, one area of the lining tube is then arranged above a first ring segment shaped element of the closing mechanism, and optionally in a step 130, the lining tube is interlocked with the first ring segment shaped element particularly by means of a screw connector.

For assembly of the further ring segment shaped elements, the first ring segment shaped element is now lifted in a step 140 and, after the lifting, the further ring segment shaped elements are connected with the first ring segment shaped element in a step 150. Subsequently, the junctions of the ring segment shaped elements can be sealed in an optional step 160, in particular by means of insulation tape.

After lowering of the hollow cylinders formed from the ring segment shaped elements in a step 170, the closing element is connected with the hollow cylinder in a step 180.

Figure 4:
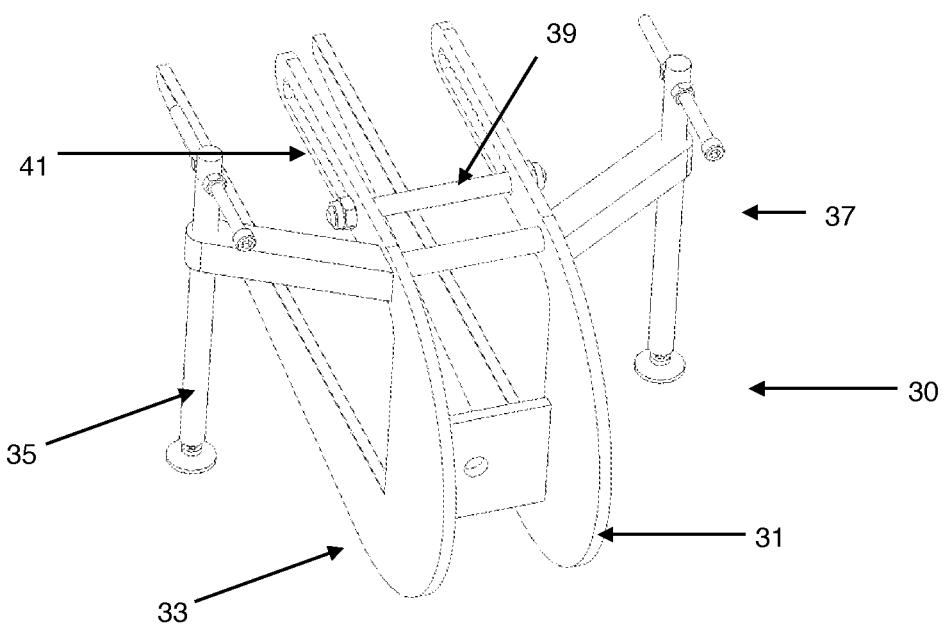
Figure 5:
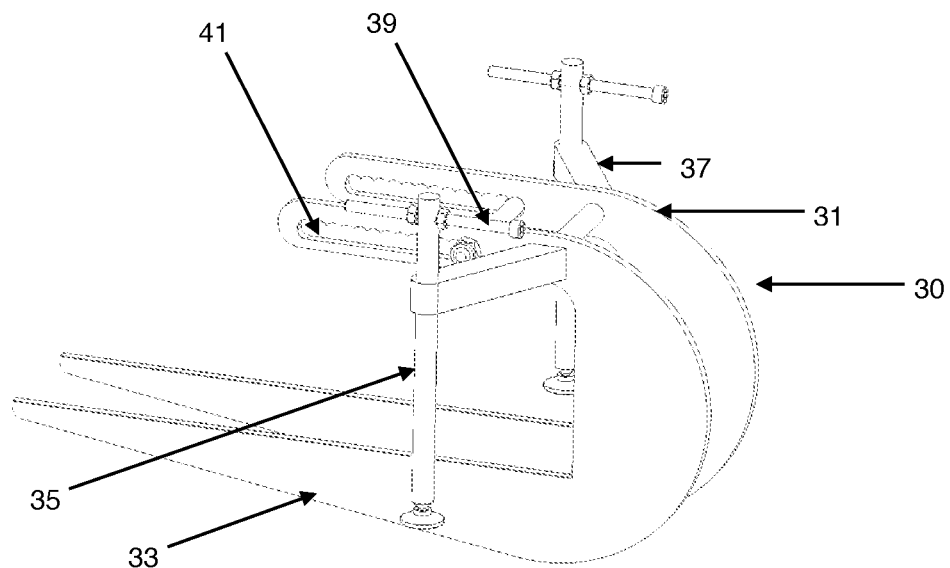
Figure 6:
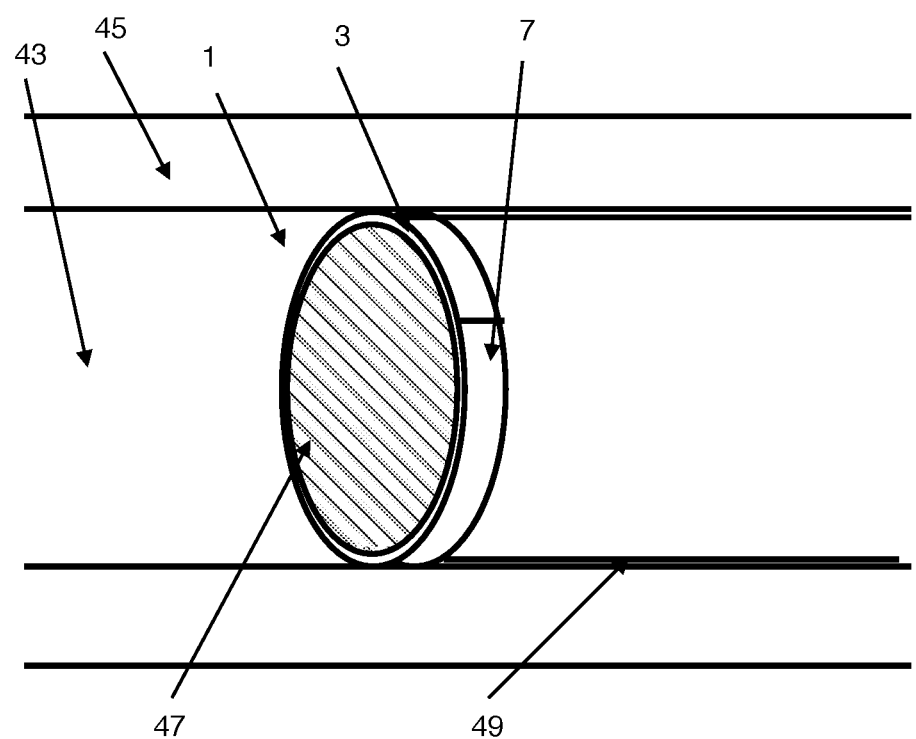
FIG. 6 shows the lining tube (49) and the closing element (47). The earth is (45), and the existing tube is (43).

FIGS. 4 and 5 show a lifting device 30 according to the present invention, which is designed and set up for lifting a ring segment shaped element (not shown). The lifting device 30 includes two U-shaped profiles 31, 33, which are arranged in parallel and spaced apart. Fastening elements 33, 35, which can generate contact pressure, are arranged on the upper extensions of the U-shaped profiles 31, 33. For this purpose, the handles of the fastening elements 35, 37 can be rotated, so that the lifting device 30 moves upward. Since this movement is impeded by the ring segment shaped element in that the lower extension of the U-shaped profiles 31, 33 prevents this movement, the lifting device 30 is detachably attached onto the ring segment shaped element.

The ring segment shaped elements as well as the lining tubes can vary in thickness or weight. To facilitate a vertical lift of the ring segment shaped element, the U-shaped profiles 31, 33 therefore have corrugated, oblong recesses (41) in which the mounting element (39) is arranged. The user can therefore adjust the point of application of force. Because of the corrugated design of the recesses, the adjusted position of the mounting element (39) can be kept under load.

The features of the invention disclosed in the above description and in the claims can be essential for the realization of the invention both individually as well as in any combinations in its different embodiments.

The invention claimed is:

1. A closing mechanism for closing one opening end of a lining tube, comprising at least two separate or separable ring segment shaped elements (3, 5, 7) which can be or are connected to one another with at least one connection element (13) and which jointly form or can form a hollow cylinder (1), wherein the hollow cylinder (1) can be closed or is closed with at least one closing element,
   wherein the hollow cylinder (1) formed by the at least two ring segment shaped elements (3, 5, 7) has a height h and a wall thickness b which is formed by the difference between external radius (11) and internal radius (12), wherein each of the ring segment shaped elements (3, 5, 7) has at least one connection element (13) on each of its opposite front face (9, 10) ends, wherein a first front face of a first ring segment shaped element (3) forms a connection area with an adjacent front face of a further ring segment shaped element (5)
   wherein the connection elements (13) are arranged on the inside of the ring segment shaped elements (3, 5, 7), wherein the one or the more connection elements (13) of a first ring segment shaped element (3) are arranged on or adjacent to its first front face end (9) along the height h of the hollow cylinder offset to the one or more connection elements (13') arranged on a further front face end (10) of an adjacently arranged further ring segment shaped element (5).

2. The closing mechanism according to claim 1, wherein the mechanism comprises n, n being 1, 2, 3, 4, 5, 6, 7, 8, 9, 10 or more, ring segment shaped elements (3, 5, 7), wherein each of the ring segment shaped elements (3, 5, 7) has a central angle of 360/n.

3. The closing mechanism according claim 1, wherein at least one connection elements (13) are formed in the shape of hollow cylinders, wherein the hollow cylinders are arranged such that the centers of the hollow cylinders of two adjacent front faces of two adjoining ring segment shaped elements (3, 5, 7) are aligned with one another, wherein one rod-shaped interlocking element (21) is or can be inserted into the aligned hollow cylinders, along a direction A.

4. The closing mechanism according to claim 1, wherein the connection areas of the ring segment shaped elements (3, 5, 7) are insulated, fluid-tight, with the aid of an insulation agent (17).

5. The closing mechanism according to claim 1, wherein at least one sidewall of at least one of the ring segment shaped elements (3, 5, 7) has at least one interlocking mechanism (15) for the at least one closing element.

6. The closing mechanism according to claim 1, wherein the at least one closing element is formed circular and has a diameter greater than or equal to the internal diameter (12) and/or smaller than or equal to the external diameter (11) of the hollow cylinder (1).

7. The closing mechanism according to claim 1, wherein at least one of the ring segment shaped elements (3, 5, 7) can be or is connected with a lifting device (30), wherein the lifting device (30) is U-shaped in order to enclose in sections the ring segment shaped element (3, 5, 7) to be lifted, and wherein the lifting device is or can be permanently connected with the ring segment shaped element (3, 5, 7) with fastening elements (35, 37).

8. The closing mechanism according to claim 7, wherein the lifting device (30) comprises at least two U-shaped elements (31, 33) which are arranged parallel to one another, wherein arranged between the U-shaped elements (31, 33) is a mounting element (39) with which a lifting device is or can be connected and which is displaceably mounted in oblong recesses (41) of the U-shaped elements (31, 33).

9. An arrangement, comprising a closing mechanism according to claim 1 and a lining tube, wherein the closing mechanism in the area of one opening end of the lining tube is arranged in inserted position in said lining tube.

10. A method comprising sealing one opening end of a lining tube with a closing mechanism according to claim 1.

11. A method for closing one opening of a lining tube, comprising the following steps, in this sequence:
 a) provision of a lining tube,
 b) provision of a closing mechanism according to claim 1,
 c) arranging one section of the lining tube above a first ring segment shaped element,
 d) lifting of the first ring segment shaped element;
 e) connection of at least one further ring segment shaped element with the first ring segment shaped element or the further ring segment shaped elements;
 f) lowering the hollow cylinder formed from the ring segment shaped elements.

12. The method according to claim 11, further comprising the step, after step c),
 g) interlocking the lining tube with the first ring segment shaped element, with a screw connector.

13. The method according to claim 11, further comprising the step, after step e),
 h) sealing of the junctions of the ring segment shaped elements, with insulation tape.

14. The method according to claim 11, further comprising the step, after step f),
 i) securing the closing element with the hollow cylinder, for sealing the opening end of the lining tube.

15. The method according to claim 11, wherein a lifting device is used for the lifting according to step d), which comprises a U-shaped profile and is arranged enclosing the same in sections from the front face of the ring segment shaped element, wherein the lifting device comprises a mounting element which is connected with a lifting device.

16. The method according to claim 15, wherein the lifting device comprises at least two U-shaped elements which are arranged in parallel, wherein the mounting element is arranged between the U-shaped elements in oblong recesses of the U-shaped elements, and that the mounting element is shifted within the oblong recesses depending on the thickness of the ring segment shaped element and/or a lining tube in order to control a vertical lift of the ring segment shaped element.

17. The closing mechanism according to claim 2, wherein the closing mechanism comprises 3 ring segment shaped elements (3, 5, 7), and wherein each of the ring segment shaped elements (3, 5, 7) has a central angle of 120°.

18. The closing mechanism according to claim 4, wherein the insulation agent (17) is insulating tape.

19. The closing mechanism according to claim 5, wherein the at least one sidewall of at least one of the ring segment shaped elements (3, 5, 7) which has at least one interlocking mechanism (15) for the at least one closing element is in the form of a threaded rod projecting perpendicular to the outside, relative to the sidewall.

* * * * *